(12) United States Patent
Ku et al.

(10) Patent No.: US 6,970,883 B2
(45) Date of Patent: Nov. 29, 2005

(54) SEARCH FACILITY FOR LOCAL AND REMOTE INTERFACE REPOSITORIES

(75) Inventors: William Hsiao-Yu Ku, Austin, TX (US); Joey Allen Perry, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 09/734,805

(22) Filed: Dec. 11, 2000

(65) Prior Publication Data

US 2002/0073078 A1   Jun. 13, 2002

(51) Int. Cl.[7] ............................................. G06F 7/00
(52) U.S. Cl. .................................... 707/103 Y; 707/3
(58) Field of Search ......................... 707/102, 103 R, 707/103 Y, 10, 3, 103 Z; 717/108

(56) References Cited

U.S. PATENT DOCUMENTS

| | | | |
|---|---|---|---|
| 5,627,979 A | 5/1997 | Chang et al. | 395/335 |
| 5,999,728 A | 12/1999 | Cable | 395/701 |
| 6,061,515 A | 5/2000 | Chang et al. | 395/702 |
| 6,064,382 A | 5/2000 | Diedrich et al. | 345/335 |

Primary Examiner—Sam Rimell

(74) Attorney, Agent, or Firm—Robert H. Frantz; David A. Mims, Jr.

(57) ABSTRACT

A system, method and user interface for searching one or more CORBA Interface Repositories for program objects based upon a set of user-specified search criteria. A user interface screen or frame is provided with two panes, the first of which allows a user to specify a variety of criteria for which to search one or more Interface Repositories using form fields, radio buttons, and/or drop-down lists. The search may be restricted to specified object servers or specified object containers. The second display pane provides a textual listing of the found objects, their location or locations, their revision dates, and the list may be selectively re-ordered and sorted. Searches may be stored for later review or transmission to other development team members. A history manager is provided to allow viewing of and selection from a list of previously executed searches.

39 Claims, 5 Drawing Sheets

SEARCH FACILITY FOR LOCAL AND REMOTE INTERFACE REPOSITORIES

BACKGROUND OF THE INVENTION

1. Field of the Invention

This invention relates to the arts of object oriented programming, and to tools for searching interface repositories on local and remote object servers. This invention relates especially to graphical browsers of interface repositories for CORBA remote and local object containers.

2. Description of the Related Art

Traditionally, programming techniques utilize a flow of steps for a procedure or process. Processes and steps are carried out from one step to another until an entire procedure or task is completed. Decision points and branches further add flexibility and breadth to a traditional program. These types of traditional programs can be represented easily by flow charts.

However, computer programs have become much more complex in recent years, and often include coordinated operations and communications between processes that are running on independent computers which are Internet worked to each other. Processes executing on "client" computers may request invocation of processes on "server" computers on their behalf, to perform specific operations, gather or return data, or invoke other processes on still other computers.

This "distributed" nature of modern computing makes it very difficult if not impossible to represent in a flow chart form all possible combinations of steps, branches and decision points interrelating the processes which are executing at the same time on different computers. Further, the approach of using flow charts to describe the high level operation level of computer program is often times unwieldy to separate into individual design projects so that the computer program can be implemented by a large team of software engineers.

One approach employed to deal with these difficulties is to break large computer programs into relatively small, self-contained items referred to as "objects." The process of decomposition of a large program into "objects" often reveals a logical structure of the problem which is to be solved by the large computer program. The formalized approach to decomposing software programs into such self-contained items or "objects" is known as Object Oriented Programming ("OOP").

Objects are actually abstractions of physical entities or conceptual items. Objects have "states" and "identities" which are inherent to their existence, and they encapsulate "properties" or "attributes", and "operations" which may change those properties or attributes. The state of an object is determined by the values of its attributes at any given time, and those attributes may be changed through its operations of the objects. Many object-oriented programming languages have been adopted and are in widespread use today, including C, C++, Smalltalk, ADA, COBOL, and JAVA. Further, the terminology used within a given object-oriented programming language may be slightly different from each other, but still represent the same concepts and design techniques. For example, implementations of an object's operations are referred to as "methods" in JAVA and "member functions" in C++.

Through the use of object-oriented programming techniques and technologies, objects which were developed or objects which were developed in different programming languages may interoperate, invoke each other, and communicate to each other.

In developing object-oriented programs, several well-known modeling methods have been developed, such as the different modeling methods developed by Booch, Jacobson and Rumbaugh. These three eventually converged and merged their modeling methods into what is now known as Unified Modeling Language ("UML"). The consortium formed by the UML developers is now called the Object Management Group ("OMG").

Although the older forms of object oriented programming modeling are still used by many engineers, UML has been adopted by many of the larger corporations involved in software development, as well as by various industry associations and consortiums.

When a designer is creating a new program or object using OOP techniques, he often relies on three main characteristics of the objects which he is including in his design: The first of those object characteristics is referred to as its "inheritance" characteristic. An object class describes a set of object end features, all of which share the same attributes and behaviors. A new class, called "subclass", may be created to define or describe a set of object instances which inherit all of the attributes and behaviors of the "superclass", or original class. As such, an object instance included in a subclass inherits all of these characteristics and functional capabilities of the members of the superclass, but it may "override" those behaviors and attributes by providing a new implementation for inherited characteristics. Inheritance is well understood in the art. Further, each object oriented programming modeling method provides for a visual format of representing objects and their relationship to each other with respect to inheritance of attributes and behaviors.

A second characteristic necessary to be understood about an object or object class to be used during design of a new computer program is its "interface." An interface is an abstraction of the way that other processes or objects may instantiate or invoke a particular object. An object's interface describes the attributes and behaviors available within an object, as well as the parameters which must be provided to the object in order for it to perform its function. The interface also describes the return information or arguments provided by the object at the conclusion of or during the operation of its function(s). Thus, for a first object or process to effectively instantiate or otherwise use a second object, the first object must be aware of and use the interface of the second object to be used.

A third characteristic of an object which is necessary to be understood by a designer when using an object is where it is "contained." The object "container" holds a group of objects within it, and it may create and destroy "instances" of objects. But, containers do not create new objects. Thus, a container, which is a type of "collection manager", may manage the creation of instances of objects within the container upon request by other objects, and may destroy those instances when the requesting object is finished using the object. For example, if an object requests an instance of another object within a container, the manager associated with that container would create a new instance of the requested object and place that under control or at the disposal of the requesting object. The concept of "containment" in containers is well understood in the art, and the OOP modeling techniques provide for methods of illustrating containment.

With the rapid spread of distributed network computing, especially over the Internet, object oriented programming readily lends itself to the inclusion of and inter-operation of objects which are physically located on servers and clients which are disparate. For example, a process running on a computer in a bank may wish to calculate the current value of an investment account. Under traditional techniques, it may do this by accessing a local or remote database of data related to investment values, and performing all of the calculations locally.

However, using distributed OOP techniques, the process on the bank computer may simply request the creation of an object which can calculate the current value of an investment portfolio. This object which does the calculation may either be located on the same server or located on another server over a computer network such as the Internet. FIG. 1 illustrates this client/server arrangement, wherein the bank computer of this example would be the "object client" computer (1), the "object server" (5) would execute the portfolio calculation methods at the request of the client computer (1), and communications of initial data and result data would be made over a computer network such as an Intranet (6) or the Internet (3).

As such, the OOP approach allows the programmer or designer of the bank computer program to defer the detailed knowledge and understanding of the portfolio calculation operation(s) to another designer who is more familiar with that operation or technology. As such, it allows for more rapid development of new programs wherein designers of new programs can rely upon and incorporate the work product of other designers through the OOP technique and conventions. As in this example, the power and benefits of object oriented programming can be easily recognized by the fact that many programs of a highly complex nature can be quickly and efficiently constructed by accessing existing objects on local and remote servers over computer networks.

To assist and standardize the process of finding and using objects that other designers have completed, an architecture known as Common Object Request Broker Architecture ("CORBA") has been developed by the OMG. CORBA 2.0 is the currently adopted revision of the CORBA standard, which is well-known within the art. Using the techniques and conventions defined in the CORBA standard, designers of object oriented programs may easily and reliably access and use objects which are stored on local as well as remote servers with little or no prior knowledge of the existence of those objects, the details of those objects, or even the interface definition of those objects. In fact, CORBA allows for executing programs to dynamically discover the existence of needed objects, determine the necessary data needed to properly invoke and initiate the needed objects, and to instantiate new instances of those objects at "run-time".

A key portion of the CORBA standard is known as Interface Definition Language ("IDL"), which defines and describes the interfaces of objects in a well-understood manner. IDL has been adopted as a standard by the International Organization for Standardization ("ISO"), and it is a simple language with similar syntax to C++ and JAVA. Interfaces which are defined by IDL can also be represented in UML representation. IDL is well-known in the art.

If an object is designed compliant with CORBA IDL, a remote client object may discover the existence of the object, ascertain its interface requirements, and request the creation of an instance of that object for use by the remote client. A remote client may also perform queries to determine the inheritance and containment characteristics of the object, as well as the exceptions it raises and the typed events it emits.

To achieve this remove discovery and invocation of objects, the CORBA standard provides for an Object Request Broker through which client objects may discover the existence of potential server objects including the operations they offer, and through which client objects may request the instantiation of object instances and control of those objects.

Turning to FIG. 3, the Object Request Broker ("ORB") (30) is shown in arrangement with client computers or processes (31) and server computers or processes (33). Each client object (32) provides an IDL interface, and each server object (34) does likewise. As such, client objects do not need to "know" where the distributed server objects actually reside, what operating system they execute under, or what programming language was used to develop them.

FIG. 2 discloses a generalized architecture of a computer platform (10) suitable for executing CORBA client objects and/or server objects. The computer may include a variety of user interface devices (13), such as a display, keyboard and mouse, but if the computer is to operate solely as a server, these may be omitted. The computer has a central processing unit ("CPU") (14), disk interfaces (15), interfaces (16) to the user interface devices, and a network interface card ("NIC") (17) such as a local area network ("LAN") card or modem. The NIC may interface to an Intranet or the Internet, or other suitable computer network (11). The computer is typically provided with a group of device drivers and basic input/output services ("BIOS") (18) and an operating system (103) such as UNIX, LINUX, IBM's AIX or OS/2, or Microsoft's Windows NT. Portable programs, such as Java Applets (101) may be interpreted by an interpreter (19), and non-portable programs (102) such as the CORBA-compliant server or client software may be executed on the platform (10) as well.

In order to facilitate the discovery of and invocation of server objects, the CORBA standard provides an Interface Repository ("IR"), which is an on-line database of object definitions. These object definitions can be captured through an IDL-compliant compiler or through the CORBA Interface Repository write functions. The CORBA specification establishes the details of how the information is organized and retrieved from the IR by specifying a set of classes whose instances represent the IR's contents. Client objects may use the IR (or multiple IRs) to create run-time invocations of server objects, and development tools may use IRs to obtain interface definitions, inheritance structures, etc., regarding available objects. Interface Repositories are well-known within the OOP arts.

However, as OPP proliferates and becomes the primary method for software development, and as more and more object servers are made available over computer networks and the Internet, it becomes increasingly difficult for a software designer to search through all of the available objects for a particular function needed. While Interface Repositories provide primitive functions for finding a needed object, a single IR query may return many results. Therefore, there is a need in the art for an efficient method and system for searching for objects within Interface Repositories, including an efficient user interface for specifying search criteria and reviewing search results.

BRIEF DESCRIPTION OF THE DRAWINGS

The following detailed description when taken in conjunction with the figures presented herein present a complete description of the present invention.

SUMMARY OF THE INVENTION

The invention provides a system, method and user interface for searching one more or CORBA Interface Repositories for objects based upon a set of specified search criteria. According to the preferred embodiment, a user interface screen or frame is divided into two panels, the first of which allows a user to specify a variety of criteria for which to search one or more Interface Repositories. The second panel provides a textual listing of the found objects, their location, revision dates, and allows for the results to be selectively re-ordered and sorted.

DETAILED DESCRIPTION OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The invention is preferably realized as a set of objects for execution on a OOP development computer, such as a personal computer running Microsoft Windows NT or IBM's OS/2 operating system. According to the preferred embodiment, the objects are developed using the Java programming language compliant with CORBA 2.0 IDL, but alternate suitable programming languages may be used to realize the objects described in the following paragraphs.

A CORBA Interface Repository ("IR") is a database containing a collection of objects that are defined by CORBA Interface Definition Language ("IDL"). The invention provides a flexible, user-friendly and powerful graphical tool to search multiple IRs on both local and remote machines. This tool requires no programming and no knowledge of CORBA programming interfaces, and specifying search criteria and viewing the results require very little effort. Search queries, results and other user remarks are recorded to allow the user to revisit them quickly, and users may also choose to send their queries, results and remarks to someone else, according to the preferred embodiment.

Figure 1:
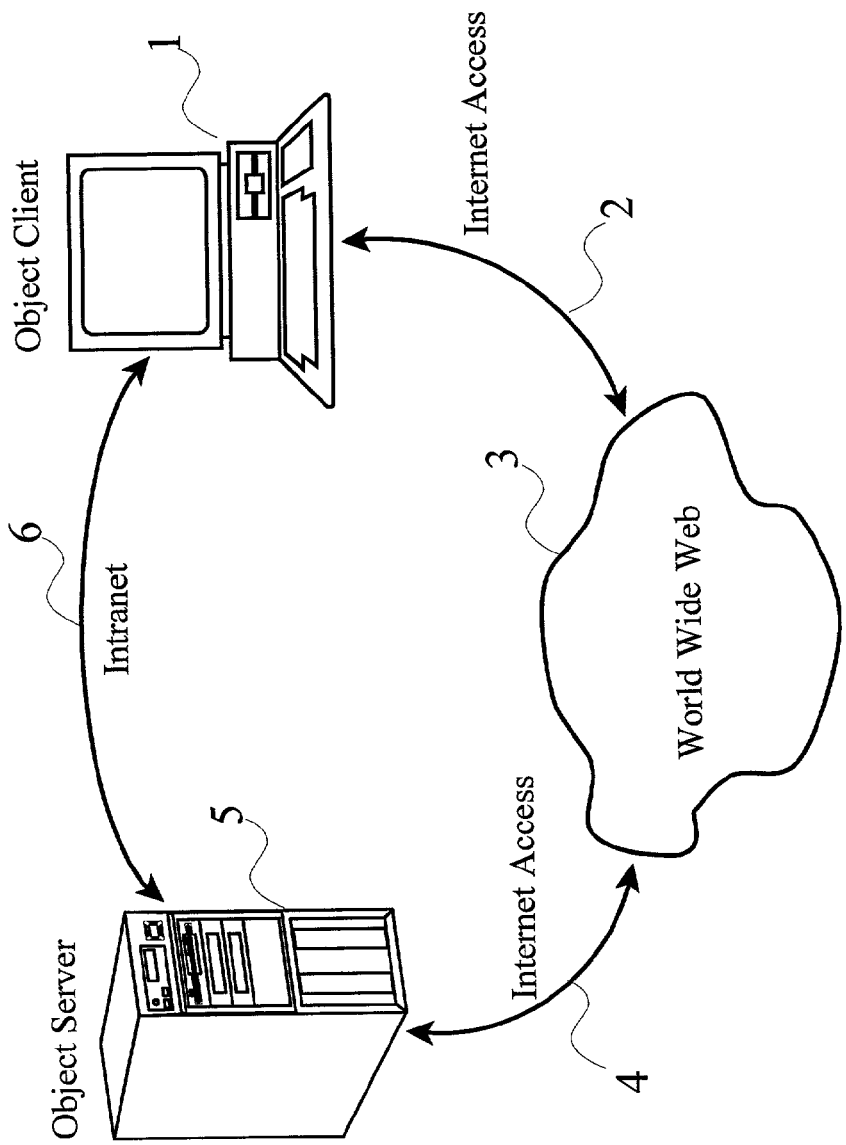
FIG. 1 illustrates the common arrangement of object client and object server computers, and especially that arrangement over computer networks such as the Internet.
Figure 2:
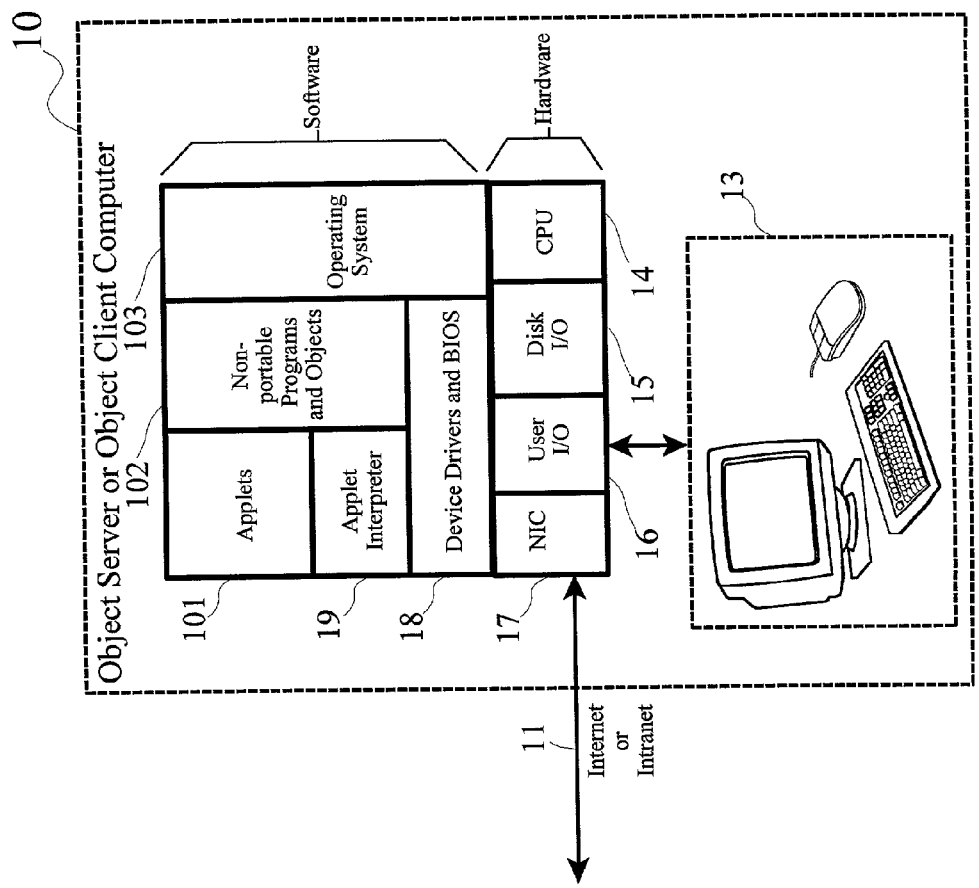
FIG. 2 shows the fundamental architecture of common networked object client and object server computer systems.
Figure 3:
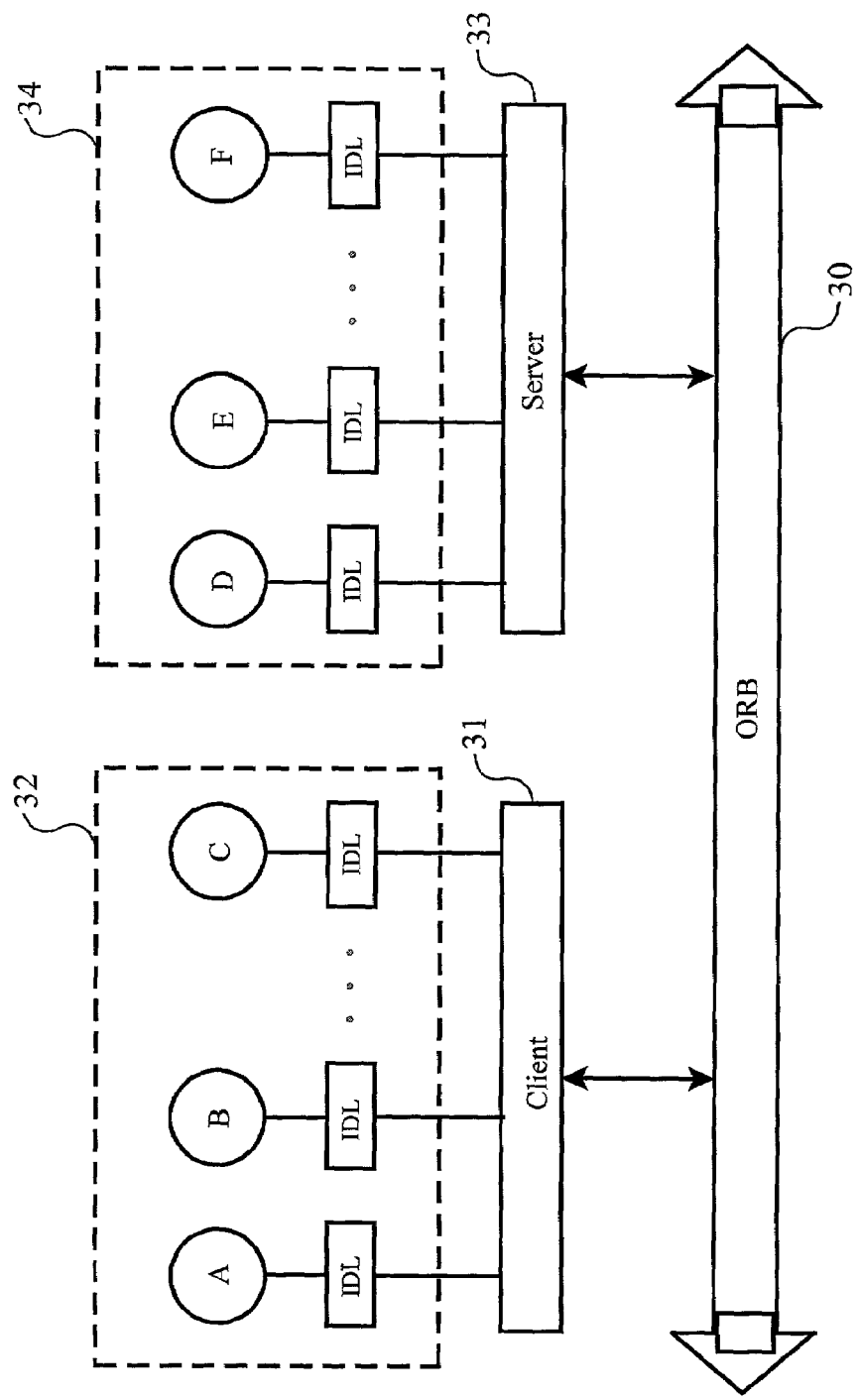
FIG. 3 presents organization and interoperation of client objects and server objects via the CORBA ORB.
Figure 4:
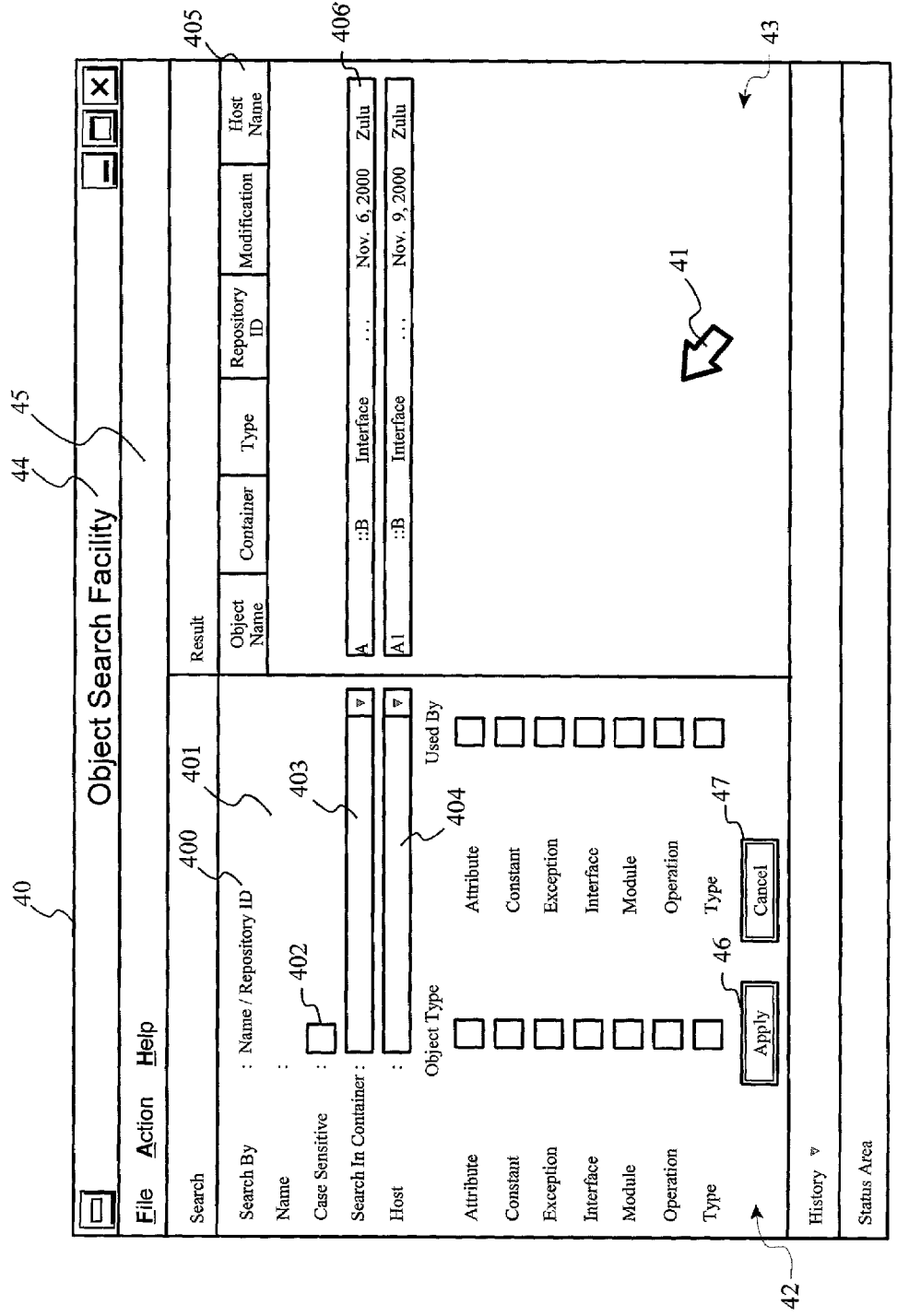
FIG. 4 provides an illustration of a user interface for specifying object search criteria and reviewing search results for searching the contents of one or more Interface Repositories according to the invention.

The search facility tool presents a "window" (40) containing two panes as shown in FIG. 4: a Search pane (42) for specifying the search query criteria, and a Results pane (45) for presenting and organizing the results of the query. These panes may be shown in any graphical user interface ("GUI") "window" or frame (40) associated with a OOP development tool, or could be realized as frames in a Hyper Text Markup Language ("HTML") browser such as Netscape's Navigator, as in the preferred embodiment. The GUI is also preferably provided with a pointing and selection icon (41) ("the mouse pointer"), but other methods for navigating the contents of the display such as by use of a TAB key and ENTER key, as well-understood in the art and are reasonable alternatives. The GUI may be displayed on any suitable computer display, such as a CRT, LCD or plasma interface, and the frame (40) is preferably provided with a title bar (44) which displays the name of the search facility tool.

The Search pane (42) contains a string-matching facility to find objects within a user-specified container or the entire interface repository. This allows the user to restrict the search to a specific container if desired. The Search pane (42) contains GUI controls that allow the user to search IRs in a number of other ways, too:

1. Search by specific repository ID or name.
2. Search for names by pattern matching using a regular expression, case sensitive or case insensitive.
3. Search for all objects that are contained in the specified object (or container, such as a module or an interface).
4. Search by specific object type or types using the following object qualifications: modules, interfaces, typedefs, unions, structs, enums, exceptions, constants, operations, and attributes. According to the preferred embodiment, a list of check boxes is used to prompt the user for his "object type" choices.
5. Filtered according to "Used By" criteria, which can be used to find the objects that refer to the search object. This allows users to search for relationships between objects. This is also a very useful feature that allows users to enter several entities to be searched in succession. For example, there may be many exceptions defined in a repository, but the user may be interested only in the exceptions that are used by operations. Or, the user can search for all structures that contains certain types in its structure members. According to the preferred embodiment, a list of check boxes are used to prompt the user for his "used by" choices.

As one can readily see, these Search query GUI controls, including the form fields, drop lists, and check boxes, can be produced using HTML forms, CGI forms (to allow the Search Facility to be a remote server), or through use of a variety of user interface programming objects such as Window's GUI objects.

The Search pane (42) is provided with an Apply button (46), which executes the search as specified, and a Cancel button (47) which clears all the user's choices and allows the search criteria to be re-entered.

Once the specified objects are found in the searched Interface Repository(ies), they are displayed in the Result pane (43) in tabular form (406), including columns for the object's name, its container, its type, its Repository ID, the date it was last modified, and its host name. The user can modify the presentation of the results by sorting them based on the name, repository ID, type or container by simply selecting or "clicking" on the column titles (405).

According to the preferred embodiment, the user can save the current search criteria and add any remarks regarding the search using an option under an "Action" heading on the menubar (45), as well as other options described in detail in the following paragraphs.

Figure 5:
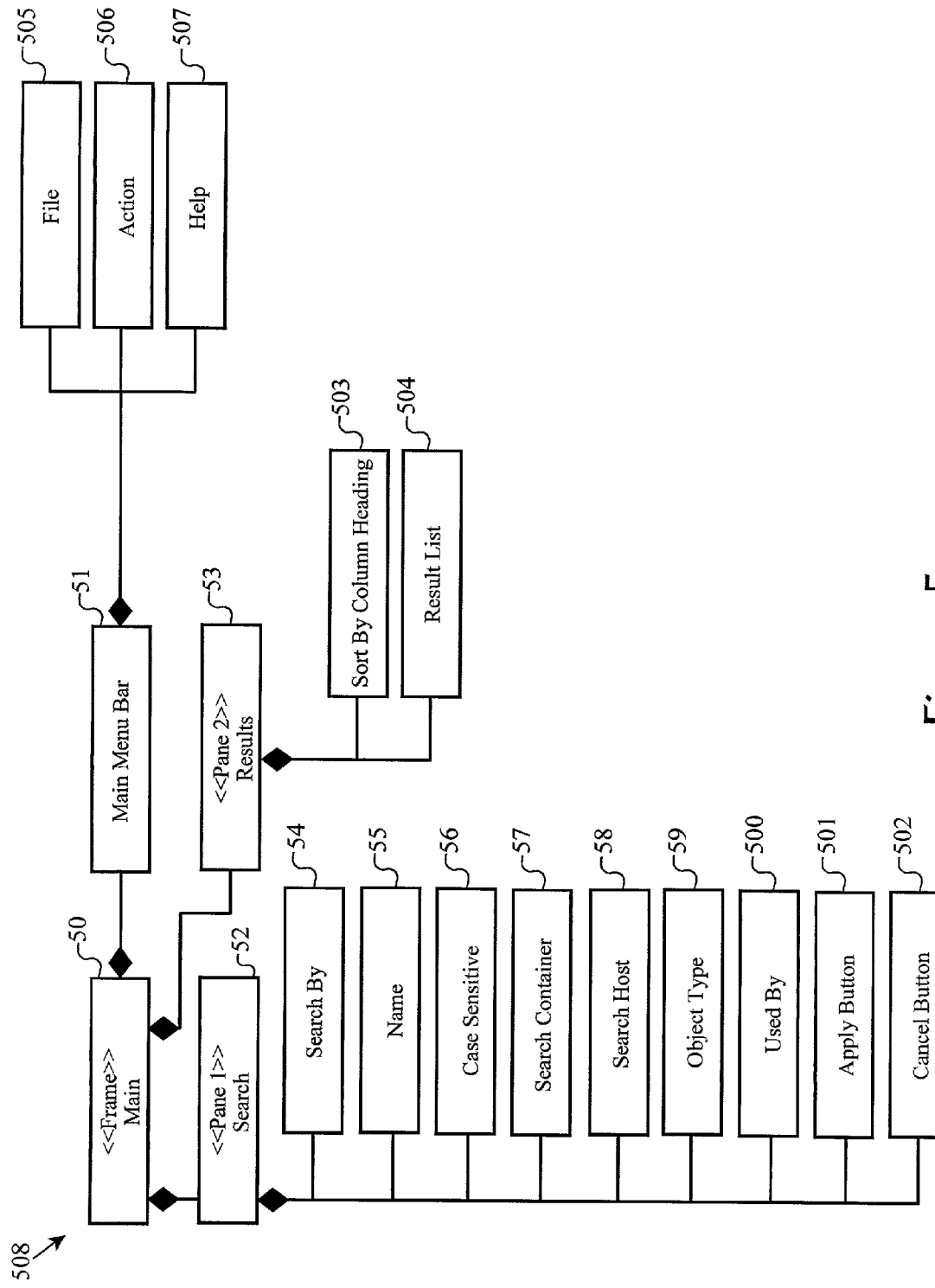
FIG. 5 shows the object model for the system and method of the invention which allows a user to search for objects using a variety of search criteria and across multiple Interface Repositories, to organize and review the search results.

Turning to FIG. 5, the object model (508) of the Search Facility tool is shown. The main frame (50) display may invoke objects to display the menubar display object (51), the Search pane display object (52) and the Results pane display object (53).

The Search pane display object (52) provides all of the abilities for the user to specify search criteria as described previously through the invocation of objects (54 through 59 and 500), which build, modify and/or execute a CORBA IR query. For example, if a user selects the search by name GUI object (401) as shown in FIG. 4, the Name search object (55) is invoked to build a search by name query, which is then executed by invoking the standard CORBA Lookup_name read method in the CORBA IR "Container" superclass. Other well-known methods of the CORBA IR superclasses "Contained", "Container", and "IRObject" are invoked by specifing other criteria in the GUI Search pane (400 through 404, 48 and 49), and by selecting the Apply button (46). For example, the CORBA IR superclasses also provide the following methods to obtain information regarding objects in the repository:

(a) Describe—returns a description structure containing the IDL for an object;

(b) Lookup—returns a sequence of pointers to objects contained in the IR;

(c) Describe_Interface—returns a structure that fully descries the object's interface including is name, Repository ID, version number, operations, attributes, and all parent interfaces;

The CORBA superclasses provide many other well-known methods for reading and navigating the IR.

The Cancel button object (502) simply clears the user-specified information and choices on the GUI and resets the search criteria.

The Results pane display object (53) provides a tabular display of the search results using a displayResults object (504), and includes an ability to sort the display results by any of the displayed information such as by name, by date modified, etc., using the sortByColumn object (503).

The menubar object (51) preferably provides a display with selectable options, including a File operations object (505), an Action object (506), and a Help object (507). The File operations object (505) preferably provides abilities for the user to save the current query criteria, results, and remarks to a file, or to open a previously-saved search file. The Action object (506) preferably allows the user to edit comments to be associated with and stored with the search criteria and results, and optimally to transmit the current search criteria, results and optional remarks to another user such as by attachment to an e-mail.

Further according to the preferred embodiment, the invention provides a history function, which when selected by the user, allows the user to review a history of searches made, their results, and any remarks entered about those searches.

It will be understood from the foregoing description that various modifications and changes may be made in the disclosed preferred embodiment of the invention without departing from its true spirit and scope, such as the use of alternate programming methodologies or languages, alternate computer platforms and software, operating systems and communications protocols. It is intended that this description is for purposes of illustration only and should not be construed in a limiting sense. The scope of this invention should be limited only by the language of the following claims.

What is claimed is:

1. A method for allowing a user to search program object interface repositories, said Interface Repository (IR) comprising an on-line database accessible through Object Request Broker (ORB) protocol, said interface repositories being stored on one or more server computers and containing metadata or definitions of said available program component interfaces, the method comprising the steps of:

providing a plurality of search criteria fields and a search icon on a graphical user display of a networked client computer;

receiving one or more criterion input from a user via said search criteria fields followed by selection of the search icon;

performing at least one search of at least one IR using said ORB protocol for interfaces to available program objects for which a match exists between the program objects' specifications and the criterion input; and displaying a list of available interfaces to program objects which match said criterion input on said graphical user display.

2. The method as set forth in claim 1 wherein said step of receiving one or more criterion input from a user includes receiving a program object name.

3. The method as set forth in claim 1 wherein said step of receiving one or more criterion input from a user includes receiving program object repository identifier.

4. The method as set forth in claim 1 wherein said step of receiving one or more criterion input from a user includes receiving program object server identifier.

5. The method as set forth in claim 1 wherein said step of receiving one or more criterion input from a user includes receiving program object container identifier.

6. The method as set forth in claim 1 wherein said step of performing at least one search of at least one interface repository includes performing a Common Object Request Broker Architecture (CORBA) Interface Repository query.

7. The method as set forth in claim 1 wherein said step of displaying a list of available interfaces to program objects includes sorting the list by program object name.

8. The method as set forth in claim 1 wherein said step of displaying a list of available interfaces to program objects includes sorting the list by program object server identifier.

9. The method as set forth in claim 1 wherein said step of displaying a list of interfaces to available program objects includes sorting the list by program object container identifier.

10. The method as set forth in claim 1 wherein said step of displaying a list of interfaces to available program objects includes sorting the list by program object modification date.

11. The method as set forth in claim 1 further comprising the step of storing said criterion input and said list of available program objects for later recall or review.

12. The method as set forth in claim 11 wherein said step of storing said criterion input and list further comprises storing a user-supplied remark associated with the criterion input and list.

13. The method as set forth in claim 11 further comprising the step of providing a history list viewable by a user, said history list comprising a summary of previously stored criterion input and lists.

14. A computer-readable medium containing program code suitable execution by an object-oriented software development workstation, said program code allowing a user to search program object Interface Repositories (IR), said interface repositories comprising an on-line database accessible through a Object Request Broker (ORB) protocol, said interface repositories being stored on one or more server computers, said available program objects' interface descriptions containing metadata or definitions of said available program component interfaces, said workstation having a processor suitable for executing program code, the program code causing the workstation to perform the steps of:

providing a plurality of search criteria fields and a search icon on a graphical user display of said workstation;

receiving one or more criterion input from a user via said search criteria fields followed by selection of the search icon;

performing at least one search of at least one IR using said ORB protocol for interfaces to available program objects for which matches exists between the program objects' specifications and the criterion input; and displaying a list of interfaces to available program objects which match said criterion input on said graphical user display.

15. The computer-readable medium as set forth in claim 14 wherein said program code for receiving one or more criterion input from a user includes program code for receiving a program object name.

16. The computer-readable medium as set forth in claim 14 wherein said program code for receiving one or more criterion input from a user includes program code for receiving program object repository identifier.

17. The computer-readable medium as set forth in claim 14 wherein said program code for receiving one or more criterion input from a user includes program code for receiving program object server identifier.

18. The computer-readable medium as set forth in claim 14 wherein said program code for receiving one or more criterion input from a user includes program code for receiving program object container identifier.

19. The computer-readable medium as set forth in claim 14 wherein said program code for performing at least one search of at least one interface repository includes program code for performing a Common Object Request Broker Architecture (CORBA) Interface Repository query.

20. The computer-readable medium as set forth in claim 14 wherein said program code for displaying a list of interfaces to available program objects includes program code for sorting the list by program object name.

21. The computer-readable medium as set forth in claim 14 wherein said program code for displaying a list of interfaces to available program objects includes program code for sorting the list by program object server identifier.

22. The computer-readable medium as set forth in claim 14 wherein said program code for displaying a list of interfaces to available program objects includes program code for sorting the list by program object container identifier.

23. The computer-readable medium as set forth in claim 14 wherein said program code for displaying a list of interfaces to available program objects includes program code for sorting the list by program object modification date.

24. The computer-readable medium as set forth in claim 14 further comprising program code for storing said criterion input and said list of interfaces to available program objects for later recall or review.

25. The computer-readable medium as set forth in claim 24 wherein said program code for storing said criterion input and list further comprises program code for storing a user-supplied remark associated with the criterion input and list.

26. The computer-readable medium as set forth in claim 24 further comprising program code for providing a history list viewable by a user, said history list comprising a summary of previously stored criterion input and lists.

27. An interface repository search facility in an object-oriented software development workstation for allowing a user to search program object Interface Repositories (IR), said interface repositories comprising at least one on-line database accessible through a Object Request Broker protocol, said interface repositories being stored on one or more server computers, said available program objects' interface descriptions containing metadata or definitions of said available program component interfaces, said interface repository search facility comprising:

a graphical user interface having a plurality of search criteria fields and a search icon displayed thereon;

one or more user input devices for inputting one or more search criterion into said search criteria fields, and for selection by a user of the search icon;

an IR searcher for searching one or more ORB interface repositories using said ORB protocol for interfaces to available program objects for which matches exists between the program object specifications and the input search criterion; and a result list of interfaces to available program objects which match said search criterion, said result list displayed on said graphical user interface.

28. The interface repository search facility as set forth in claim 27 wherein said search criteria fields includes a field for specifying a program object name.

29. The interface repository search facility as set forth in claim 27 wherein said search criteria fields includes a field for specifying a program object repository identifier.

30. The interface repository search facility as set forth in claim 27 wherein said search criteria fields includes afield for specifying a program object server identifier.

31. The interface repository search facility as set forth in claim 27 wherein said search criteria fields includes a field for specifying a program object container identifier.

32. The interface repository search facility as set forth in claim 27 wherein said interface repository searcher is adapted to perform Common Object Request Broker Architecture (CORBA) Interface Repository queries and searches.

33. The interface repository search facility as set forth in claim 27 further comprising a result list sorter for sorting the result list by program object name.

34. The interface repository search facility as set forth in claim 27 further comprising a result list sorter for sorting the result list by program object server identifier.

35. The interface repository search facility as set forth in claim 27 further comprising a result list sorter for sorting the result list by program object container identifier.

36. The interface repository search facility as set forth in claim 27 further comprising a result list sorter for sorting the result list by program object modification date.

37. The interface repository search facility as set forth in claim 27 further comprising a search storing facility for storing said criterion input and said list of available program objects for later recall or review.

38. The interface repository search facility as set forth in claim 37 wherein said search storing facility further comprises a remark editor for storing a user-supplied remark associated with the criterion input and list.

39. The interface repository search facility as set forth in claim 37 further comprising a history list manager for creating and producing a search history list viewable by a user, said history list comprising a summary of previously stored criterion input and lists.

* * * * *